United States Patent [19]

Takasago et al.

[11] Patent Number: 4,853,915
[45] Date of Patent: Aug. 1, 1989

[54] OPTICAL RECORDING/REPRODUCING METHOD AND APPARATUS FOR OPTICAL DISK MEDIUM HAVING UNIQUE CONTROL PARAMETERS

[75] Inventors: Masahiro Takasago; Shinichi Arai, both of Odawara, Japan

[73] Assignee: Hitachi, Ltd., Chiyoda, Japan

[21] Appl. No.: 110,358

[22] Filed: Oct. 20, 1987

[30] Foreign Application Priority Data

Oct. 24, 1986 [JP] Japan .................. 61-251628

[51] Int. Cl.$^4$ .............................................. G11B 7/00
[52] U.S. Cl. ........................................ 369/32; 369/54; 369/58; 360/25; 360/29
[58] Field of Search ............ 369/32, 33, 53, 54, 369/58, 47; 358/342; 360/25, 29, 31, 48, 69

[56] References Cited

U.S. PATENT DOCUMENTS 4,674,071  6/1987  Okumura et al. ............... 369/47 X
4,769,802  9/1988  Tatsuguchi et al. ............. 369/47 X

FOREIGN PATENT DOCUMENTS 56-25278  11/1981  Japan .

Primary Examiner—Robert L. Richardson
Attorney, Agent, or Firm—Kenyon & Kenyon

[57] ABSTRACT

An optical disk is provided with a dedicated track area for recording optical conditions for read and write operations. The apparatus includes different types of demodulating circuits for allowing any type of demodulation to be adopted. After parameters, recorded on the dedicatad track area through phase encoding demodulation, are read out, the demodulating circuit compatible with the modulation type adopted in recording the data is selected for demodulation of the data.

18 Claims, 4 Drawing Sheets

CONTOL TRACK

SECTOR FORMAT

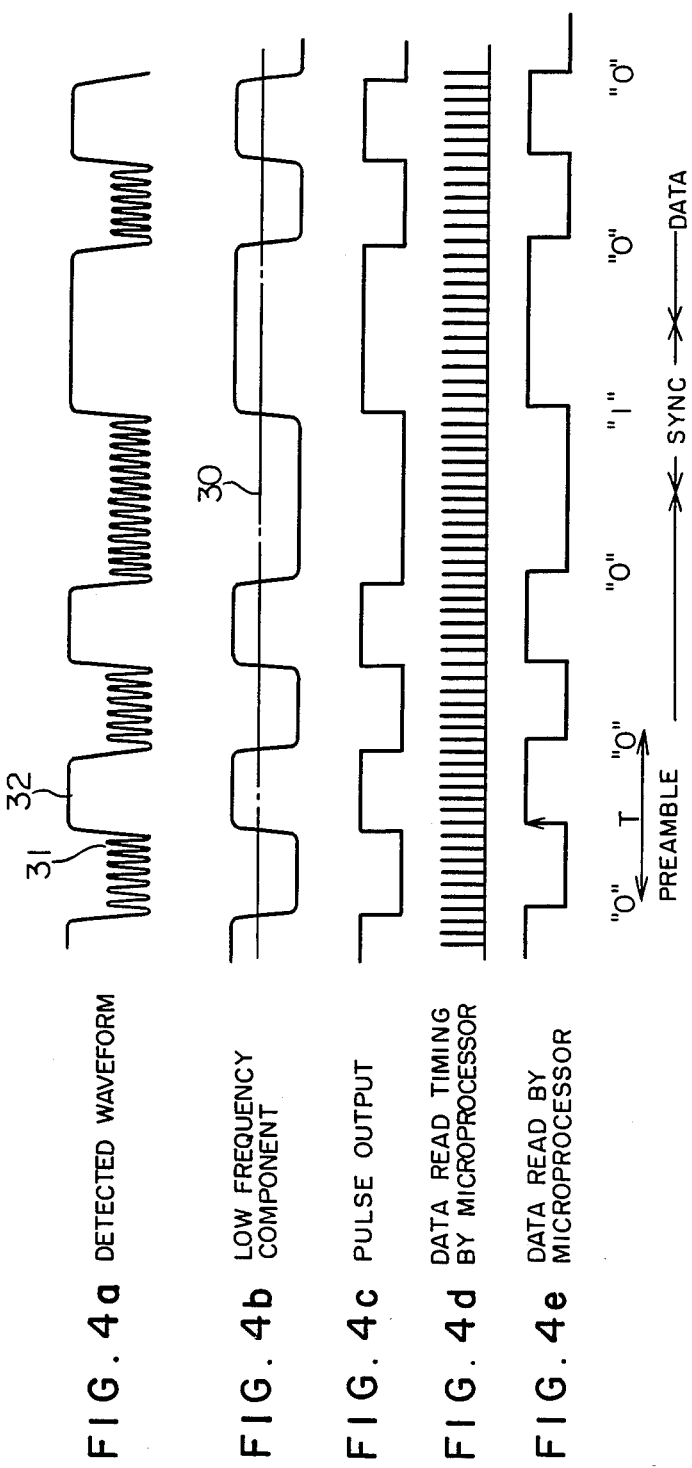

DECODING OF INFORMATION DATA

OPTICAL RECORDING/REPRODUCING METHOD AND APPARATUS FOR OPTICAL DISK MEDIUM HAVING UNIQUE CONTROL PARAMETERS

BACKGROUND OF THE INVENTION

The present invention generally relates to an optical information recording/reproducing method and an apparatus for carrying out the same. More particularly, the invention is concerned with a recording system which is advantageously suited for ensuring interchangeability (compatibility) among existing recording medium of different types or between the currently used recording media and those of increased record density which will become available for practical application in the not too distant future.

In the prior art optical disk storage system, it is known that an index area is provided on a disk for storing therein data for retrieval, data for access designation and those for other purposes, as is disclosed, for example, in Japanese Patent Application Laid-Open No. 25278/1981 (JP-A-56-25278).

There are, however, established a variety of specifications for the recording system in respect to the recording light (laser) power, reflection factor of the disk and other parameters, and any given recording system is so designed to conform with one of the specifications. Consequently, a recording/reproducing apparatus designed to operate with the disk having the reflection factor of a certain predetermined value is not in the position to perform the recording/reproducing operation on another disk having a reflection factor which differs from the predetermined one. Further, a system in which a new modulation method developed with the aim to realize the high density recording is adopted is incapable of reproducing information recorded on the disk of the old type. Therefore, the disks which are currently used can no more find utility in the recording-/reproducing system of the coming generation. It goes without saying that such absence of interchangeability or compatibility among the recording media provides much inconvenience. Thus, there exists a great demand for realizing the interchangeability of the recording media since otherwise the old type of disk could not be used in the future system which will no doubt adopt a novel modulation method in an effort to increase the recording density.

SUMMARY OF THE INVENTION

An object of the present invention is to provide an optical disk recording/reproducing apparatus which is capable of reading control information recorded on a disk together with data, which information is referenced to when the data is to be read out or reproduced from the disk.

Another object of the present invention is to provide an optical disk reading system which is capable of reading the information concerning the optical reading conditions imposed inherently to the recording disk, which information is recorded on the disk at a predetermined region and read out to be processed in a manner different from the reading of the data.

Still another object of the present invention is to provide an optical recording/reproducing apparatus which can read/write data from/on a disk by utilizing control parameter information indicative of modulation type after the control parameter information has been derived from a corresponding record on the disk through a simple and reliable optical reading method.

It is a further object of the present invention to provide an optical recording/reproducing apparatus which is capable of searching a control track on which information about the types of modulations and others are recorded and which apparatus is further capable of reading the above information with a simple optical reading apparatus for the purpose of making access to data. The information and data are recorded, respectively, through different types of modulations on an optical recording medium.

It is a still further object of the present invention to provide an optical recording/reproducing apparatus which can discriminatively identify features characterizing various types of optical disks and perform recording/reproducing operations proper to the various disks, respectively, without involving any significant increase in the quantity of hardware.

In view of above and other objects which will become more apparent as the description proceedes, it is taught according to the present invention that a specific region is provided on a disk to be mounted on an optical recording/reproducing apparatus, and identification information, for discriminatively identifying the disk, is previously recorded on the track of the same by a modulation method differing from the modulation employed for recording data on a user data region (such as MFM and 2-to-7 modulation usually requiring a phase locked loop); The optical head of the recording/reproducing apparatus is indexed over the abovementioned specific region (e.g. control track area including a plurality of control information tracks) to read the identification data in precedence to a reading of the data from the user data region. In accordance with the result of the identification reading operation mentioned above, circuits of the optical disk apparatus participating in the data recording/reproducing operation are changed over to the state in which the user data can be recorded or reproduced. The modulation adopted in recording the identification information on the specific region is so selected that demodulation can be accomplished with the aid of a microprogram for the purpose of preventing the amount of requisite hardware from increasing. Further, such an arrangement is proposed which allows the optical head to be indexed or positioned onto the abovementioned specific region without need for recognizing addresses recorded on the disk. After the optical head has been positioned onto the control track, the control data read out from that track is demodulated with a microprogram or with a program of a microprocessor, wherein control data or information such as modulation type, recording power and other parameters obtained through the demodulation are loaded in the optical recording/reproducing apparatus to be utilized in intialization thereof. In this manner, the processing procedures and parameter values such as modulation type, recording power and others can be set in correspondence with the disk of concern, whereby recording/reproducing can be performed on a variety of disks with one and the same optical recording/reproducing apparauts.

BRIEF DESCRIPTION OF THE DRAWINGS

FIGS. 4a to 4e are views for illustrating a control information reading and decoding procedure in accordance with an emobodiment of the present invention.

DETAILED DESCRIPTION

Now, the present invention will be described in detail in conjunction with the exemplary and preferred embodiment by reference to the drawings.

Figure 1:
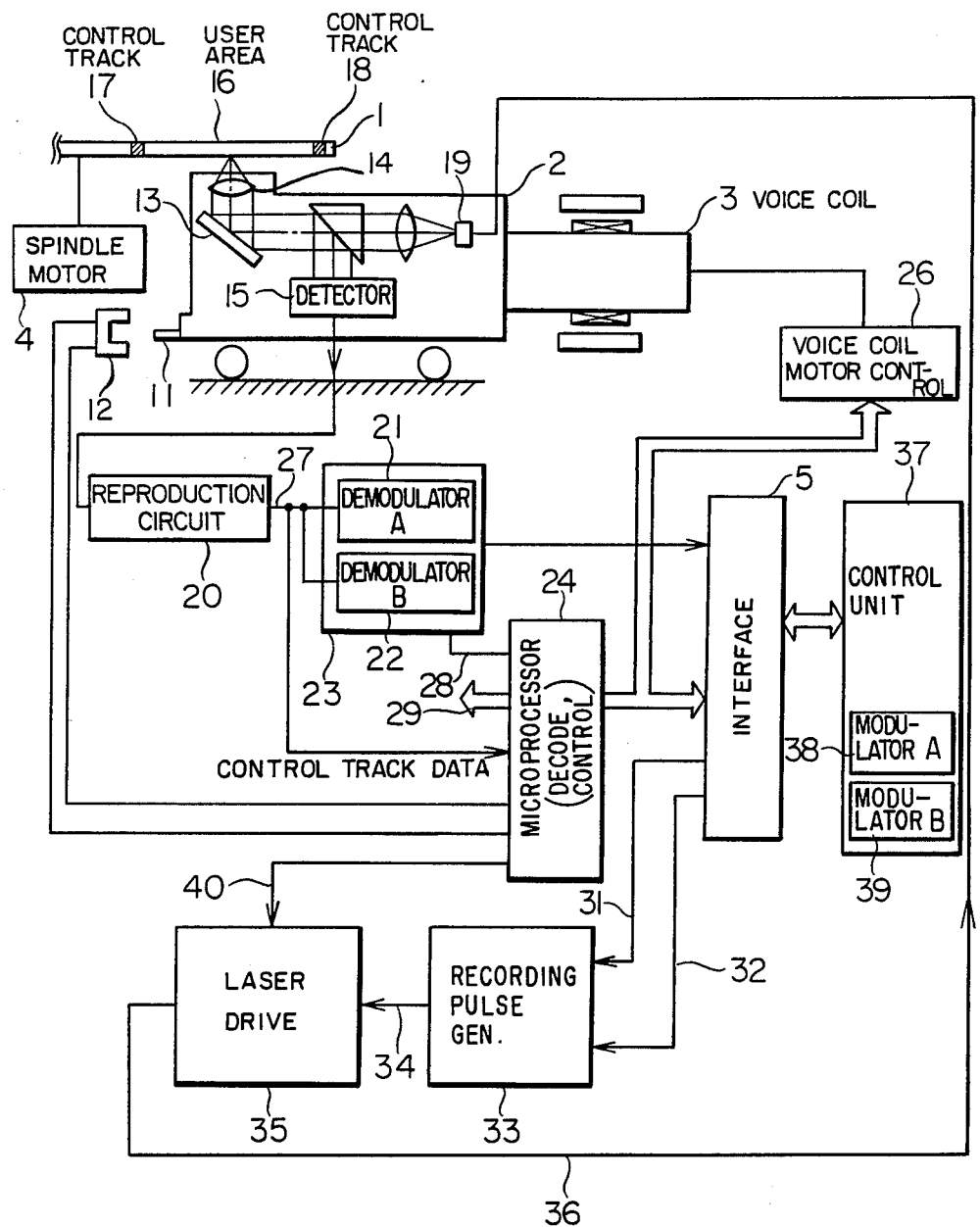
FIG. 1 is a view showing a general arrangement of an optical recording/reproducing apparatus according to an exemplary embodiment of the present invention.

FIG. 1 shows a general arrangement of an optical recording/reproducing apparatus according to an embodiment of the present invention. A reference numeral 1 denotes an optical disk driven rotationally by a spindle motor 4. Provided for the purpose of writing on and reading from the optical disk 1 is an optical head 2 which is composed of an objective lens 14, a galvano-mirror 13, a semiconductor laser 19 and a photodetector 15. In order to allow the whole optical head 2 to make access to the optical disk 1 over the whole surface thereof, a voice coil motor (hereinafter referred to as VCM) 3 is provided. The objective lens 14 and the galvano-mirror 13 are controlled so that automatic focussing and tracking operation can be accomplished. However, since such control constitutes no essential part of the subject matter of the present invention, detailed description thereof will be unnecessary. Further, those parts which are not important to the present invention are also omitted from illustration.

A position detector 12 serves for detecting that the optical head 2 has attained the permissible innermost position.

When the optical disk 1 is set on the spindle motor 4, the latter starts rotation. Upon attainment of the steady rotation state of the motor 4, the seminconductor laser 19 is energized to emit light.

The VCM 3 is supplied with a current through a VCM control circuit 26 under the control of a microprocessor 24, whereby the optical head 2 is moved to a position to which the position detector 12 makes a response. Although the position detector 12 is assumed to be located at the permissible innermost position in the illustrated apparatus, it may be disposed on the outermost peripheral position. Further, a pair of such position detectors may be installed at the innermost and the outermost positions, respectively. In any case, the position detector 12 is composed of a light emitting element and a light receiving element (both being omitted from illustration). By providing the optical head 2 with a projection 11 which can be inserted between the light emitting element and the light receiving element of the position detector 12 in such a positional relationship that upon track following operation activated when the optical head 2 has attained the position at which the position detector 12 can respond, the optical head 2 assumes the position just over a control data area 17, it is possible to index the optical head 2 at the position just over the control track area 17 without reading any information from the optical disk 1 as it traverses the disk on the way. It will be readily understood that another position detector can be provided in association with an outer control track 18.

Information on the optical disk 1 is detected by the photodetector 15, the output signal of which is processed through a reproduction circuit 20, whereby a data signal 27 is obtained. Data read from a user data area 16 is demodulated by a data demodulation circuit 21 or 22 to be transferred to a control unit 37 by way of an interface circuit 5. On the other hand, the data signal 27 originating in the control track area 17 or 18 is decoded directly by a known microprogram, by hardware, or by a program running on a microprocessor 24. Thus, the information recorded on the control track is fetched by the microprocessor 24. On the basis of this information, the microprocessor 24 effectuates initialization of the optical recording/reproducing system.

In FIG. 1, reference numeral 28 denotes a signal for changing over the demodulation circuits 21 and 22 so that the demodulation circuit corresponding to the modulation type detected from the data retrieved from the control track is turned on, and a numeral 40 denotes a power command signal for designating a maximum read power to be supplied to the semiconductor laser 19 upon data reading operation (reproduction mode) and a maximum record power to be supplied to the laser 19 in the data writing operation (recording mode). A numeral 29 denotes collectively other switching/control signals. The control track areas 17 and 18 are provided within the track region with predetermined distances from the center of the optical disk 1, respectively.

When data is to be written in the user area 16, the type of modulation for the data is determined on the basis of information supplied to the control unit 37 from the control track area 17 or 18 through the microprocessor 24 and the interface circuit 5. In dependence on the type of modulation determined, modulation-A circuit 38 or modulation-B circuit 39 is energized to generate write data and a write clock signal which are then supplied to a recording pulse generator circuit 33 through the interface circuit 5. On the basis of the input write data, the recording pulse generator circuit 33 produces a pulse signal having a pulse duration corresponding to that of the recording current to be supplied to the laser. To this end, the recording pulse signal 34 is applied to the laser drive circuit 35 for generating the current to drive the semiconductor laser 19.

Figure 2:
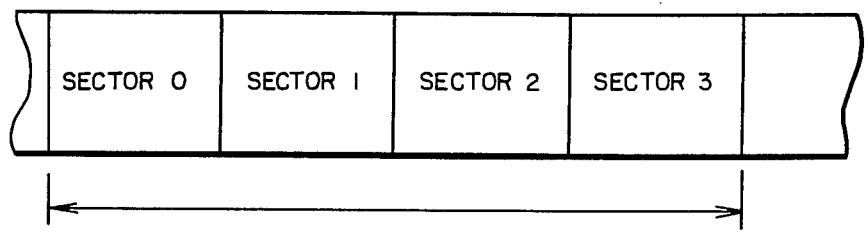
FIG. 2 is a view showing a structure of a control track employment according to an embodiment of the present invention.

Detail of the control track is shown in FIG. 2. As will be seen, one control track is divided into a plurailty of sectors in which the identical control information are recorded, respectively. The division of one track into a plurality of sectors, as mentioned above, is for the purpose of preventing the influence of any defect which may be present on the optical disk 1. It is preferred that several hundred or more control data tracks be provided so that the optical head can be positioned on a control information track without resorting to the use of address for the control track. Usually, the degree of precision at which the optical head 2 can be positioned is on the order of 0.1 m/m or less. Accordingly, the control information track area including several hundred tracks and having width of 0.3 to 1.0 m/m can assure that the optical head makes access to one of the control tracks without fail. Further, the bit density of control information data recorded on the control track should be selected so low that the data can be decoded (demodulated) by the microprocessor without exerting any adverse influence to the servo control, as described hereinafter. The encoding of the data to be recorded on the control track may be realized by a simple encoding technique such as phase encoding (PE) which needs no PLL (phase locked loop).

Figure 3:
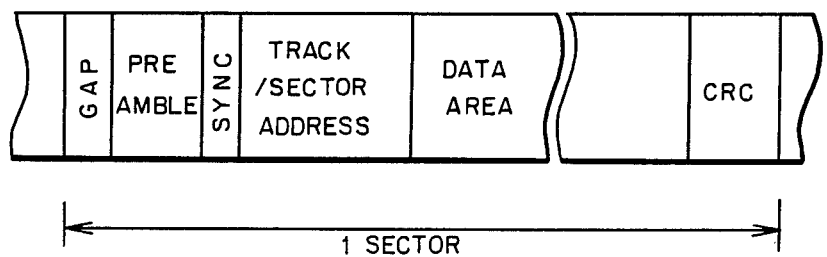
FIG. 3 is a view showing, by way of example, a format of a sector constituting a part of the control track of FIG. 2.

An example of the format for one sector of the control information track is illustrated in FIG. 3. The sector format includes fields such as those labelled GAP indicating a start of the sector, PREAMBLE for phase matching or the like purpose, SYNC indicative of the timing at which the data reading is to be started, TRACK/SECTOR ADDRESS containing addresses, DATA in which data is recorded, CRC used for error detection and others. It should be understood that the format shown in FIG. 3 is only exemplary and the present invention is not restricted to such a format.

FIGS. 4a to 4e show, by way of example, a recording scheme of the control information on the control track. The control information data is so written that the signal waveform shown in FIG. 4a is an output of the photodetector 15 upon a reading of the data. It will be seen that the data is phase-encoded such that dense repetition patterns 31 having duration of 2 to 4 $\mu s$ are alternately combined with blank portions 32 containing no data. With such short length or duration of the dense repetition pattern, it is aimed to suppress the influence to the servo-control system to a minimum. In order to allow the read-out signal to be decoded with a microprogram running on the microprocessor, digitization of the signal is required. To this end, a low-frequency signal component such as shown in FIG. 4b is extracted from the waveform shown in FIG. 4a and shaped into a pulse signal shown in FIG. 4c with reference to a slice level 30. The pulse signal (FIG. 4c) is then read by the microprocessor in the form shown in FIG. 4e under the timing pulse of short duration shown in FIG. 4d.

A decoding method of the sector information will be described by paying attention to the transition from "PREAMBLE" field to "SYNC". Although the PREAMBLE field is assumed to contain a series of "0s", a same result can be obtained even when the PREAMBLE is constituted by a succession of "1s".

In the decoding, the time interval t between a point of change in the fetched data and the succeeding change point is measured. When the measured time t satisfies the following condition:

$$\frac{T}{2} - \Delta T_1 \leq t \leq \frac{T}{2} + \Delta T_1$$

where T: bit length, and $\Delta T$: permissible variation determined in consideration of fluctuation in rotation speed, nonuniformity of disk, errors involved in the processing by electric circuitry and other variables.

It is then determined that bits "0s" or "1s" make appearance in succession. In this conjunction, it should however be mentioned that allocation of the bit value to PREAMBLE and SYNC is previously determined. For example, when PREAMBLE is represented by a succession of "0s", the SYNC is given by bit "1" and vice versa.

On the conditions, when a bit makes appearance subsequently with the time span t which meets the following condition:

$$T - \Delta T_2 \pm t \pm T + \Delta T_2$$

then, that bit is determined to be the SYNC bit. In the following, it is assumed that the PREAMBLE bit is logic "0" with SYNC bit being "1" for simplication of description.

Figure 6:
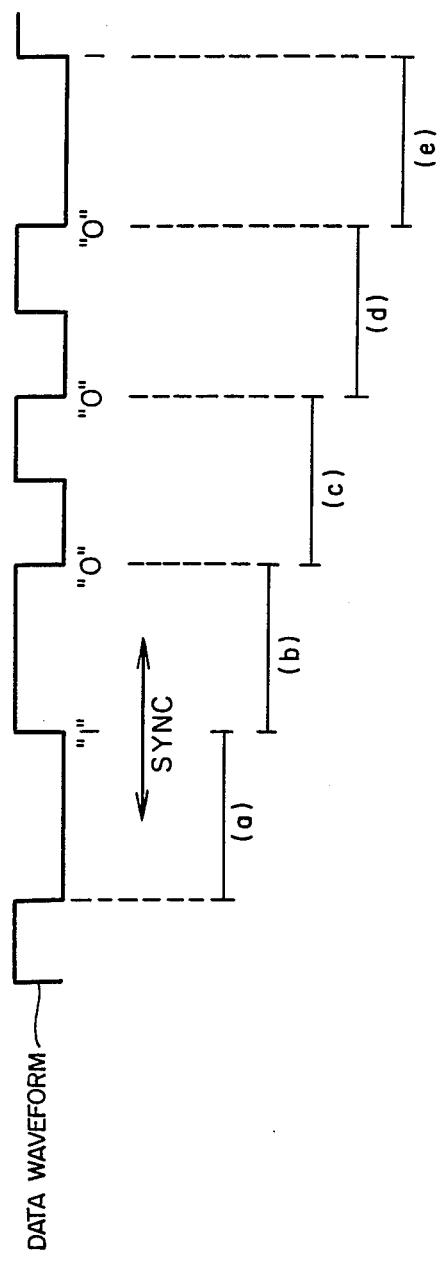
FIG. 6 is a view for illustrating a decoding of data making appearance in succesion to a bit signal "SYNC" recorded in the sector.

FIG. 6 is a diagram showing the waveform as read out. In an interval (a), the timing SYNC bit is detected, whereupon the reading and decoding of data are started. In a succeeding interval (b), no change occurs in the waveform within a time space defined by $T \pm \Delta T_2$. Accordingly, the data bit is "0" (as inverted relative to the preceding bit). In an interval (c), a change occurs in the waveform at a time point $T/2 \pm \Delta T_1$ within the time span $T \pm \Delta T_2$. Accordingly, the corresponding bit is "0" (same as the preceding bit). In the similar manner, the data of "1" or "0" is successively decoded.

Figure 5:
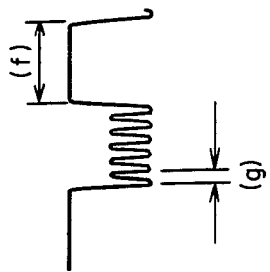
FIG. 5 is a view showing a portion of a signal waveform produced by an optical head upon reading of the control information in accordance with an embodiment of the present invention.

FIG. 5 shows comparatively durations of the low frequency portion and the high frequency portion in the waveform illustrated in FIG. 4a. More specifically, the duration (f) is selected to be 20 to 40 micro seconds with the duration (g) being 180 to 400 nano seconds, which is suited for the reading and decoding with the microprogram in the microprocessor.

Since a great number of control tracks are provided and each of them include a plurality of sectors having the same content, it is conceivable with a view to enhancing reliability of the data, to perform the reading/decoding on the plural sectors (e.g. three sectors), wherein the valid data is determined in accordance with an algorithm such as the majority rule. With this method, influence exerted by a defect can be more positively suppressed.

In addition to reading the type of modulation and the power of laser beam for recording, control information such as the laser light wavelength for recording, the size of sector, the rotational number of disk, maximum permissible read power, erase power suited for erasure of data, and the width of laser beam for writing can be read out and decoded. By setting these data values in the laser drive circuit 35 (FIG. 1) in precedence to a data read operation, data access can be accomplished with a reduced error rate.

What I claim is:

1. An optical recording/reproducing apparatus comprising:
    (a) an optical disk medium including a plurality of tracks of information comprising a first set of specific tracks that store, as control parameter information, an optical condition, associated with that disk, for a light beam for recording/reproducing to the optical disk medium and a second set of tracks on which data is to be recorded on and reproduced from;
    (b) an optical head, movable in the radius direction of said optical disk medium, that is capable of reading from said optical disk medium by irradiating the disk with a light beam;
    (c) means for detecting that said optical head has been positioned where a portion of said first set of specific tracks is irradiated with the light beam;
    (d) first means for demodulating the data from that portion of the light beam reflected from said second set of tracks of said optical disk medium irradiated by said light beam through said optical head;
    (e) second means for demodulating the control parameter information from that portion of the light beam reflected from said specific tracks of said optical disk medium irradiated by said light beam through said optical head; and (f) means, responsive to a result of the operation of said second means for demodulating, for controlling said first means for demodulating, said means for controlling further controlling the optical condition of the light beam for reproducing the data from said second set of tracks.

2. An optical recording/reproducing apparatus according to claim 1,
wherein said first means for demodulating includes third means for demodulating an MFM-modulated signal and fourth means for demodulating a 2-to-7 modulated signal; and
wherein said means for controlling includes means for selecting either one of said third or fourth means for demodulating on the basis of information included in said control parameter information concerning the type of modulation in said second set of tracks.

3. An optical recording/reproducing apparatus according to claim 2, wherein said means for controlling includes means for setting a current to be supplied to said optical head on the basis of the value of recording power data contained in said control parameter information.

4. An optical recording/reproducing apparatus according to claim 1, wherein said means for detecting includes a projection mounted on said optical head and an optical sensor installed in said optical recording/reproducing apparatus for producing a signal indicating that the optical path thereof is interrupted by said projection when said optical head has attained a position where said light beam irradiates a track on said recording medium, having said control parameter information recorded thereon.

5. A method of writing information on a recording medium, that stores intrinsic data in accordance with a first modulation process and also includes a plurality of parameter information tracks, that is mounted on an optical recording/reproducing apparatus, comprising the steps of:
irradiating a parameter information track on said recording medium with a light spot, said parameter information track storing a parameter regarding said disk, including recording power and first type of modulation process, said parameter information track being located in a designated region on the recording medium and said parameter information being stored by a modulation process of a type differing from said first modulation process and with a bit interval sufficiently wide to allow demodulation of said parameter information to be performed with a microprogram;
writing intrinsic data onto said optical disk using the recording power indicated by said information; and
wherein the parameter information recorded on said designated region is phased-encoded parameter data, a signal for which includes a low frequency component having a half-period of 20 to 40 micro seconds and a high frequency component having a period of 180 to 400 nano seconds, said parameter information being recorded on more than three areas in a parameter information track said plurality of parameter information tracks exceeding one hundred in a number.

6. An optical recording/reproducing apparatus, comprising:

(a) an optical disk medium including a plurality of tracks of information consisting of a first set of specific tracks that store as control parameter information, an optical condition for a light beam for recording/reproducing peculiar to the optical disk medium and a second set of tracks on which data is to be recorded on and reproduced from;

(b) an optical head, movable in the radius direction of said optical disk medium, that is capable of reading from said optical disk medium through irradiation with the light beam;

(c) a plurality of demodulating circuits connected to said optical head and including,
  (i) a plurality of first means for demodulating said data by using a phase locked loop, and
  (ii) second means for decoding said control parameter information indicating optical write and read conditions;

(d) means for moving said optical head to a predetermined position such that a specific track of said first set of tracks can be irradiated by the light beam;

(e) means, connected to said second means for decoding, for selecting one of said plurality of first means on the basis of information contained in said control parameter information regarding the type of modulation used for storing the data.

7. An optical recording/reproducing apparatus according to claim 6, further including
laser drive circuitry capable of controlling power supplied to said optical head on the basis of information contained in said control parameter information regarding recording power associated with said disk.

8. An optical recording/reproducing apparatus comprising:

(a) a semiconductor laser for emitting a light beam;

(b) an optical disk medium, rotatably set, having a plurality of tracks formed on said medium including a first group of tracks on which data is to be recorded by a user and a second group of tracks on which control information, for at least controlling the light beam from said semiconductor laser, is previously recorded in order to record data on or reproduce data from said first group of tracks;

(c) means for modulating the light beam from said semiconductor laser in order to record data on said first group of tracks;

(d) an optical head for guiding the light beam so that the light beam is incident to a certain track on said optical disk medium to record data on said certain track;

(e) means for reproducing, from a light beam reflected from a certain track on said optical disk medium upon which the light beam through said optical head is incident, the data recorded on said certain track; and (f) means for controlling said means for modulating in accordance with control information reproduced by said means for reproducing from among said second group of tracks.

9. An optical recording/reproducing apparatus according to claim 8, wherein second group of tracks are a plurality of tracks wherein each track includes a plurality of sectors and wherein the same control information is previously recorded in the plurality of sectors of each track over the plurality of tracks of the second group of tracks.

10. An optical recording/reproducing apparatus according to claim 9, wherein the control information recorded on said second group of tracks includes information indicating the modulation type for said first group of tracks, and wherein said means for controlling serves to control said means for modulating the light beam according to the modulation type peculiar the first group of tracks of said optical disk medium as indicated in said control information.

11. An optical recording/reproducing apparatus according to claim 8, wherein said optical head is movable in the radius direction of the optical disk medium, further comprising means for detecting that said optical head has reached a position where the light beam emitted from said semiconductor laser is incident to one of said second group of tracks.

12. An optical recording/reproducing apparatus according to claim 8 or 9, wherein a modulation type for previously recording control information on said second group of tracks on said optical disk medium is different from the modulation type for recording data on said first group of tracks.

13. An optical recording/reproducing apparatus according to claim 12, wherein the modulation type for recording information on said second group of tracks is less complex than that for said first group of tracks.

14. An optical recording/reproducing apparatus according to claim 12, wherein a PE modulation type is used to record information on said second group of tracks and a 2-7 modulation is used to record data on said first group of tracks.

15. A method for recording/reproducing information on an optical disk medium, having a plurality of tracks, in an apparatus including a means for producing a light beam to record data on a first group of said plurality of tracks, comprising the steps of:

(a) defining, on said optical disk medium, a second group of tracks distinguished from a first group of tracks on which data is to be recorded by a user;

(b) previously recording control information that controls at least said light beam used to record data on said first group of tracks;

(c) projecting the light beam onto at least one track of said second group of tracks;

(d) reproducing said control information from said second group of tracks; and (e) projecting the light beam onto a certain track of said first group of tracks while modulating the light beam in accordance with the reproduced control information thereby to record the data for a user on the track.

16. A method for recording/reproducing information on an optical disk medium according to claim 15, further comprising the step of detecting that the light beam has been projected onto a certain track of said second group of tracks.

17. A method for recording/reproducing information on an optical disk medium according to claim 15, wherein said control information includes information indicative of the modulation type in recording/reproducing the data for said first group of tracks and the light beam is modulated in accordance with the modulation type indicated by the reproduced control information.

18. A method for recording/reproducing information on an optical disk medium according to claim 15, wherein said control information includes information indicative of the wavelength of a light beam in recording information on said first group of tracks and the power of a maximum light beam in reproducing information therefrom.

* * * * *

UNITED STATES PATENT AND TRADEMARK OFFICE
CERTIFICATE OF CORRECTION

PATENT NO. : 4,853,915

DATED : 1 August 1989

INVENTOR(S) : Masahiro TAKASAGO et al.

It is certified that error appears in the above-identified patent and that said Letters Patent is hereby corrected as shown below:

| Column | Line | |
|---|---|---|
| 2 | 31 | Change "loop);" to --loop).-- |
| 2 | 68 | Change "invention;" to --invention.-- |
| 3 | 2 | Change "employment" to --employed--. |
| 3 | 3 | Change "invention;" to --invention.-- |
| 5 | 68 | Change "$T - \Delta T_2 + t + T + T_2$" to --$T - \Delta T_2 \leq t \leq T + \Delta T_2$--. |

Signed and Sealed this

Third Day of December, 1991

*Attest:*

HARRY F. MANBECK, JR.

*Attesting Officer*     *Commissioner of Patents and Trademarks*